United States Patent [19]
McCloskey

[11] 3,884,537
[45] May 20, 1975

[54] BALL BEARING ASSEMBLY

[75] Inventor: Albert R. McCloskey, Fairfield, Conn.

[73] Assignee: Rockwell International Corporation, Pittsburgh, Pa.

[22] Filed: Mar. 15, 1973

[21] Appl. No.: 341,696

[52] U.S. Cl. .................................. 308/6 C
[51] Int. Cl. ............................ F16c 17/00
[58] Field of Search .............. 308/6 C; 64/23.7

[56] References Cited
UNITED STATES PATENTS

| | | | |
|---|---|---|---|
| 2,620,163 | 12/1952 | Stone | 64/23.7 |
| 2,945,366 | 7/1960 | Sears | 308/6 C |
| 3,464,745 | 9/1969 | Schaeffler | 308/6 C |
| 3,545,826 | 12/1970 | Magee et al. | 308/6 C |

FOREIGN PATENTS OR APPLICATIONS

| 1,931,983 | 7/1971 | Germany | 308/6 C |
|---|---|---|---|

Primary Examiner—Charles J. Myhre
Assistant Examiner—R. H. Lazarus

[57] ABSTRACT

An anti-friction ball bearing assembly adapted for mounting on a circular shaft comprising an outer sleeve and an inner sleeve concentrically fitting within said outer sleeve, the inner sleeve having a number of tracks defining paths for the circulation of balls between said sleeves and said shaft during movement between said shaft and said bearing assembly, said shaft having a plurality of longitudinally extending shallow raceways providing generally conforming bearing surfaces for said balls as they encounter said shaft and said raceways, said vertical depth of said raceway being only a fraction of the diameter of said balls.

2 Claims, 7 Drawing Figures

BALL BEARING ASSEMBLY

BACKGROUND OF THE INVENTION

This invention relates to a ball bearing assembly adapted to move longitudinally along the shaft.

In particular the invention relates to an anti-friction ball bearing assembly adapted for mounting on a circular shaft comprising an outer sleeve and an inner sleeve concentrically fitting within said outer sleeve, the inner sleeve having a number of tracks defining paths for the circulation of balls between said sleeves and said shaft during movement between said shaft and said bearing assembly, said shaft having a plurality of longitudinally extending shallow raceways providing generally conforming bearing surfaces for said balls as they encounter said shaft and said raceways, said vertical depth of said raceway being only a fraction of the diameter of said balls.

The prior art is replete with different types of recirculating ball bearing assemblies. Typically, the prior art forms of bearings are subject to high rates of wear between their respective parts. Additionally, they are intricate in design and expensive to manufacture. Premature wear may for example occur when the various bearing assembly components are operationally unstable. This instability will cause the recirculating balls to bind during heavy or sustained load conditions. This binding will cause among other things scoring of the balls and shaft which introduces alignment inaccuracies and ultimate failure of the bearing assembly.

A number of patents can be cited as examples of prior art which were unable to achieve the results of the present invention. For example U.S. Pat. No. 2,349,957 to Greve, and U.S. Pat. No. 3,466,101 to Hudson, and U.S. Pat. No. 3,606,499 to Gauser et al, all disclose bearing devices in which their rolling members are shaped to conform to the shaft. These configurations are basically inefficient and susceptible to premature wear.

Similarly one could refer to U.S. Pat. No. 1,094,972 to Bocorselski, and U.S. Pat. No. 2,620,163 to Stone, and U.S. Pat. No. 2,891,823 to Galonska which all are adapted to transmit torque. Each of these bearing devices are provided with deep grooves on the shaft which, because of high friction loading, are unacceptable for prolonged linear bearing movement. Another general grouping of prior art patents which disclose inefficient bearing devices which are particularly susceptible to premature wear are U.S. Pat. No. 2,681,836 to Jarund, and U.S. Pat. No. 3,563,616 to Allen.

It may be said of the prior art as typified by the above noted patents that they failed to appreciate the need to closely control the bearing interface between the rolling members, e.g. balls or rollers and the linear member, e.g. shaft or column. It is at this area that a substantial amount of wear has occurred in the prior art linear bearing devices.

SUMMARY OF THE INVENTION

Accordingly it is an object of the present invention to provide an anti-friction ball bearing assembly adapted for mounting on a circular shaft comprising an outer sleeve and an inner sleeve concentrically fitting within said outer sleeve, the inner sleeve having a number of tracks defining paths for the circulation of balls between said sleeves and said shaft during movement between said shaft and said bearing assembly, said shaft having a plurality of longitudinally extending shallow raceways providing generally conforming bearing surfaces for said balls as they encounter said shaft and said raceways, said vertical depth of said raceway being only a fraction of the diameter of said balls.

It is another object of the present invention to closely control the bearing interface between the balls of bearing assembly and the bearing surface presented by the shaft.

It is still another object of the present invention to provide a ball bearing assembly of the linear type in which the bearing assembly rides on a circular shaft in which are formed longitudinally formed raceways of a length at least equal to the length of travel of the ball bearing assembly on the shaft.

It is another object of the present invention to provide a highly efficient ball bearing assembly capable of being inexpensively manufactured and being simplistic in design.

It is yet another object of the present invention to provide an anti-friction ball bearing assembly adapted for mounting on a circular shaft comprising an outer sleeve and an inner sleeve concentrically fitting within said outer sleeve, the inner sleeve having a number of tracks defining paths for the circulation of balls between said sleeves and said shaft during movement between said shaft and said bearing assembly, said shaft having a plurality of longitudinally extending shallow raceways providing generally conforming bearing surfaces for said balls as they encounter said shaft and said raceways, said vertical depth of said raceway being only a fraction of the diameter of said balls, the vertical depth of said raceways on the circular shaft is substantially equal to seven and one-half percent of the diameter of the balls.

Another object of the present invention is to provide an improved anti-friction ball bearing assembly having superior load carrying characteristics.

It is still another object of the present invention to provide an improved anti-friction ball bearing assembly which can be manufactured using automated high volume techniques.

Another object of the present invention is to provide a ball bearing assembly in which there is formed on the shaft a shallow raceway surface for each group of circulating balls.

Other objects and advantages of the invention will become apparent as the present invention is better understood from the following disclosure and as shown in the accompanying drawings.

DESCRIPTION OF THE DRAWINGS

The accompanying drawings, referred herein and constituting a part hereof, illustrate an embodiment of the invention, and together with the description, serve to explain the principles of the invention.

In the drawings.

DESCRIPTION OF THE INVENTION

Figures 1, 2:
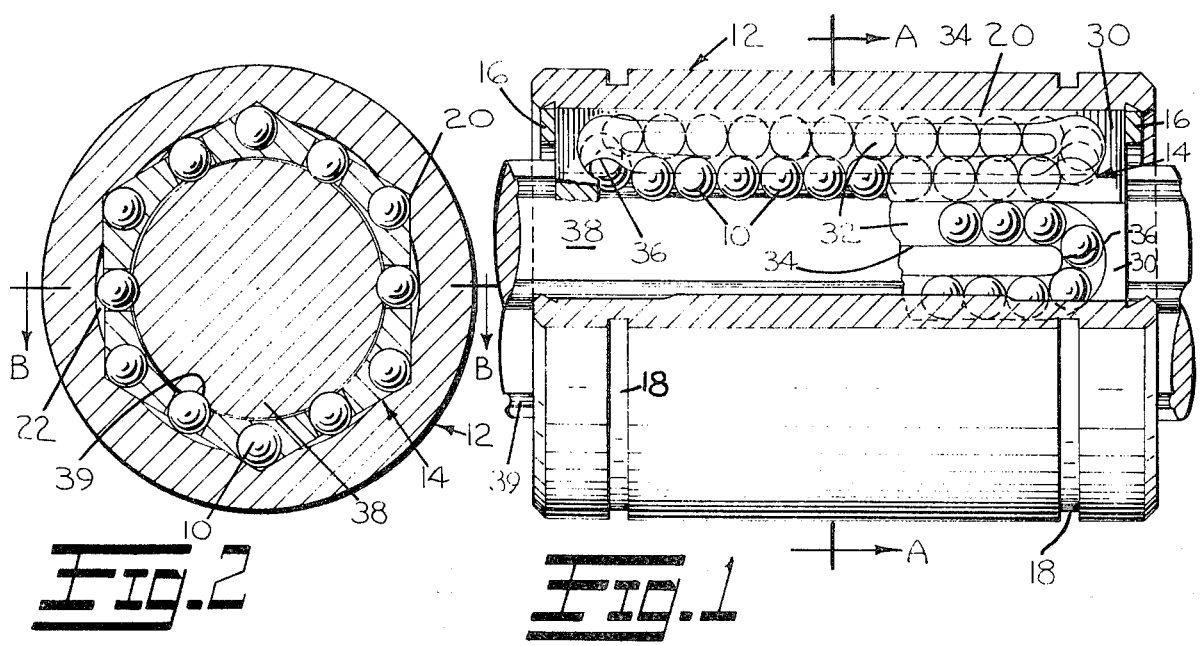
FIG. 1 is a side elevation view, partially cut away, of a ball bearing assembly embodying the invention mounted on a shaft.
FIG. 2 is an end section taken along the line A—A of FIG. 1.

Referring to the drawings, the improved anti-friction ball bearing assembly of the invention includes anti-friction bearing balls 10, and outer sleeve 12 and an inner sleeve 14 serving as a bearing ball retainer. Retaining means such as snap rings 16 are provided at each end of the assembly to anchor the inner and outer sleeves axially relative to each other to form a unit. Outer sleeve 12 is a cylinder having a machined outer surface which is uninterrupted except for two annular grooves 18 formed adjacent the ends of the outer sleeve which receive retaining means, such as snap rings (not shown), to anchor the ball bearing assembly to a bushing housing. Outer sleeve 12 has an inner surface formed with a plurality of axially extending grooves 20 equidistantly spaced about the inner surface circumference.

Figures 4, 5:
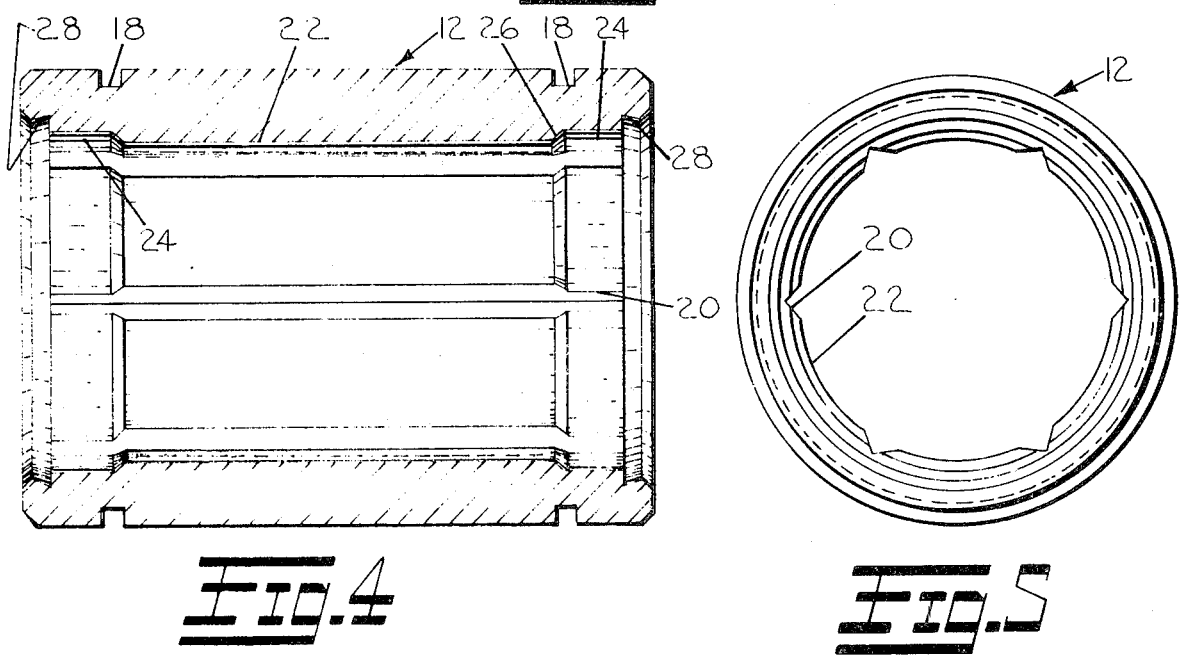
FIG. 4 is an enlarged side section of the outer sleeve of the bearing assembly of FIG. 1 showing inner surface details thereof.
FIG. 5 is an enlarged end view of the outer sleeve of the bearing assembly of FIG. 1.

As can be seen in FIG. 4, there are provided axially extending concave bearing surfaces 22 interposed between the grooves 20. A recessed concave end surface 24 may be provided adjacent each end of surface 22. Concave end surfaces 24 are recessed with respect to surfaces 22 in the outer sleeve 12. A smooth transition is provided between surfaces 22 and 24 by means of tapered reliefs 26. The degree of taper will vary according to among other things the degree of clearance necessary to allow the balls to track into the grooves 20. An annular groove 28 is provided at each end of the inner surface of the outer sleeve 12 to serve as a seat for a retaining ring 16 or other suitable retaining means.

Figure 3:
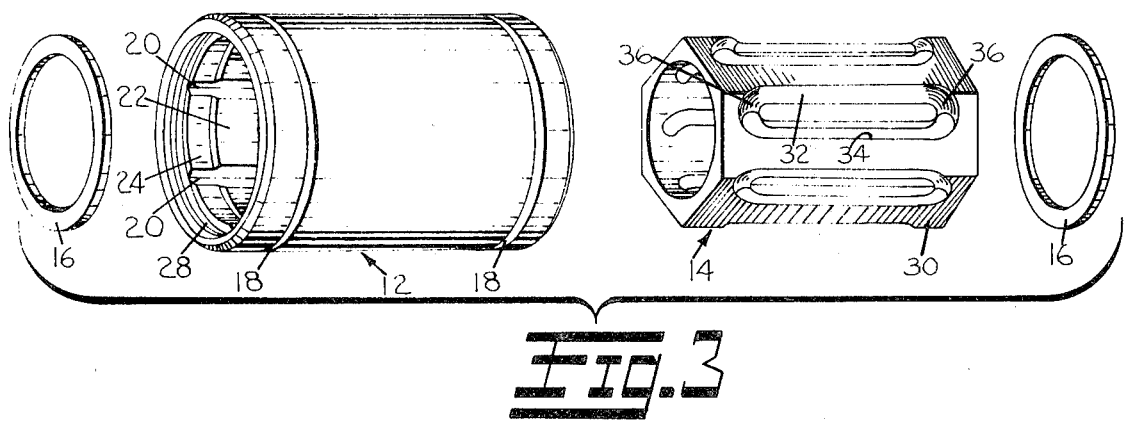
FIG. 3 is an exploded perspective view of the assembly of FIG. 1 with the anti-friction balls removed.

Rings 16 serve to prevent axial movement of the inner sleeve with respect to the outer sleeve. They may be dished or snap rings and may be formed of metal, plastic, or other suitable material. These rings may be positioned in grooves 28 to secure the inner sleeve 14 within the outer sleeve 12. FIG. 3 shows retaining rings 16, however, a retaining flange or rib can easily be made integral with the inner sleeve at one end thereof. It is also possible when using a resilient plastic material for the inner sleeve to have integrally formed thereon a retaining flange or rib at each end of the inner sleeve. A single plastic rib extension (not shown) could also be formed on the inner sleeve 14 and engage a locating recess (not shown) formed internally in the inner surface of the outer sleeve at a position not interferring with the circulation of the ball bearings.

In FIG. 3 there is shown an inner sleeve 14 having a plurality of plane portions 30 which define a polyhedron. A plurality of balls 10 circulate along tracks formed in plane portions 30. Each track is comprised of a groove 32 and a slot 34. The ends of each groove 32 are curved and are interconnected by similarly curved ends of slots 34.

Slots 34 extend completely through inner sleeve 14 and are apertured to have a width somewhat less than the diameter of bearing balls 10. Each curved end of groove 32 is provided with a ramp 36 to permit the balls to enter and leave grooves 32. The straight portions of the apertured slots 34 define the paths of circulation of the balls 10 while they are in load bearing contact with the shaft 38 and the concave bearing surfaces 22. Substantially frictionless relativee movement is thereby acheived between the bearing assembly and shaft 38.

We are at this juncture in the explanation and description of the present invention to best describe its major point of novelty. As before mentioned the novelty primarily resides in the provision of longitudinally extending raceways (denoted as numeral 39) on the periphery of the circular shaft 38. At first blush this might seem a simple measure having little effect on the performance and life of the described bearing assembly. Actually arbitrary selection of the depth of the raceway as well as its degree of ball surface conformity, could well result in a bearing assembly having extremely poor friction characteristics. The present invention appreciates and takes into consideration this very important relationship. Accordingly, it has been determined that the raceway surface on the circular shaft must generally conform to the outer round shape of the ball 10. Additionally and most importantly it must be shallow in depth and be specifically related to the diameter of the balls 10. In particular it has been determined that the depth ($d$) of the raceways 39 should be substantially equal to 7½ percent of the diameter of the ball 10.

The raceways 39 are of such a length as to accommodate the full linear traverse of the bearing assembly on the shaft 38. There is a raceway 39 for each loop or set of balls 10.

Figure 7:
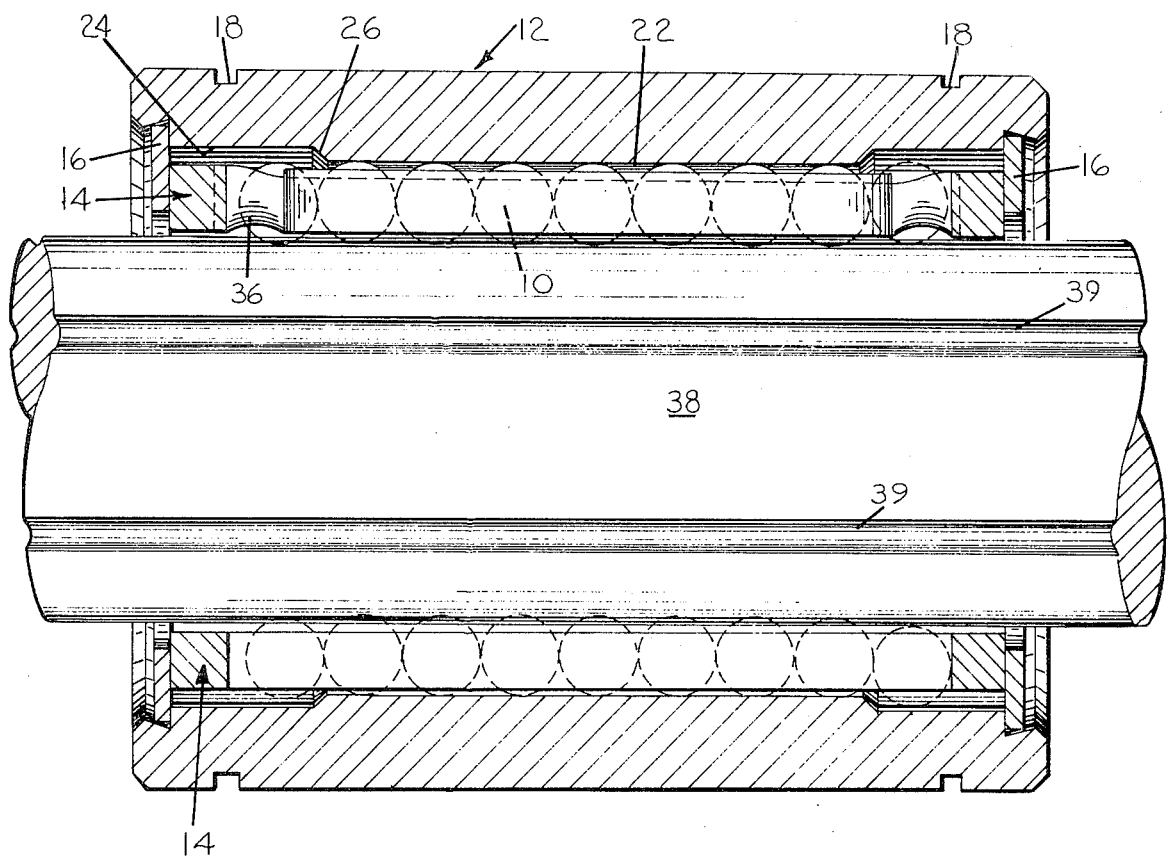
FIG. 7 is a sectional view taken along the B—B of FIG. 2.
Figure 6:
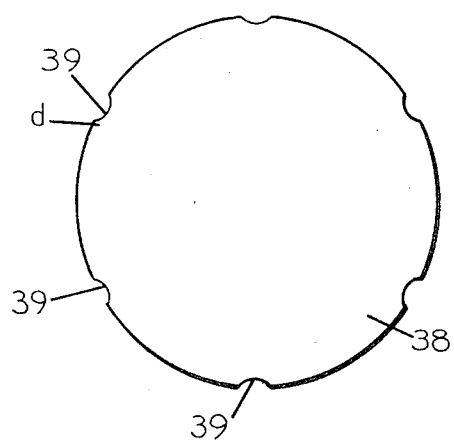
FIG. 6 is an end view of the circular shaft of the bearing assembly of FIG. 1 having the shallow raceway surfaces formed in its peripheral surface.

Application of concept of the present invention to the linear bearing assembly art results in an improved linear bearing having very low friction characteristics. A direct benefit is longer life of both the bearing assembly and the circular shaft 38. The latter element, i.e. shaft 38, could be an integral part of an expensive apparatus and its replacement could result in prohibitive maintenance costs and costly machine down time. Continuing with the description of the bearing assembly guideways 20 serve to pervent rotational movement of sleeve 15 within 12 and with grooves 32 define the straight portion of the track in which the balls 10 are out of contact with the raceways 39 of the shaft 38. This also serves to align the axially extending slots 34 of the inner sleeve with the axially extending concave bearing surfaces 22. As can be seen in FIGS. 1 and 7, the balls are in an unloaded state, i.e., are out of active contact with the raceways 39 of the shaft 38, where they encounter the end surface 24. This facilitates smooth transition to and from the apertured slot 34.

There is thus provided an anti-friction ball bearing assembly in accordance with the present invention which is extremely simple in construction and design and is easy and economic to manufacture and assemble. The assembly procedure could be fully automated to further reduce the overall cost of the bearing. The bearing may be assembled by inserting the inner sleeve within the outer sleeve with the balls in place. This may be accomplished by registering the intersecting plane portions of the inner sleeve with the grooves 20.

Additionally, it will be appreciated that the various components of the bearing assembly in accordance with the present invention could be manufactured out of a wide range of materials including various types of plastics and metals. For example, the outer sleeve 12 may be manufactured from a hardenable steel as SAE 5200 steel.

The inner sleeve because of its simplistic form can be manufactured from even a wider range of materials as for example lightweight metals including aluminum and zinc alloys. Obviously, plastics and other moldable materials could also be used to make the inner sleeve.

Various modifications of the bearing of the invention may be made without departing from the spirit or scope thereof and it is to be understood that the invention is to be limited only as defined in the appended claims.

I claim:

1. An anti-friction ball bearing assembly in combination with a shaft comprising an outer sleeve and an inner sleeve concentrically fitting within said outer sleeve, said inner sleeve having a central opening for the passage of said shaft therethrough, balls, the inner sleeve having a number of tracks defining paths for the circulation of said balls between said sleeves and said shaft during relative movement between said shaft and said bearing assembly, the outer surface of the inner sleeve being polyhedronal in shape, the inner surface of the outer sleeve being provided with a number of guideways, the intersections of the plane portions defining the outer surface of the inner sleeve registering with said guideways, said inner surface of the oter sleeve is further provided with a number of substantially concave bearing surfaces aligned with said tracks such that they provide a rolling bearing surface for said balls, while said balls are in their loaded state, said shaft having a plurality of longitudinally extending shallow raceways providing generally conforming bearing surfaces for said balls as they encounter said shaft and said raceways, said vertical depth of said raceways being only a fraction of the diameter of said balls, the length of said raceways on said circular shaft is at least equal to the linear travel of said bearing assembly, there being a raceway on said circular shaft for each track of balls.

2. An anti-friction ball bearing assembly in accordance with claim 1 wherein the vertical depth of the raceway is substantially equal to 7½ percent of the diameter of said balls.

* * * * *